United States Patent
Crocker et al.

(10) Patent No.: US 9,691,186 B2
(45) Date of Patent: Jun. 27, 2017

(54) CONSTRAINT OF A SUBDIVIDED MODEL

(71) Applicants: Gary Arnold Crocker, San Diego, CA (US); Wei-en Ting, San Diego, CA (US)

(72) Inventors: Gary Arnold Crocker, San Diego, CA (US); Wei-en Ting, San Diego, CA (US)

(73) Assignee: IntegrityWare, Inc., San Diego, CA (US)

(*) Notice: Subject to any disclaimer, the term of this patent is extended or adjusted under 35 U.S.C. 154(b) by 0 days.

(21) Appl. No.: 14/530,630

(22) Filed: Oct. 31, 2014

(65) Prior Publication Data
US 2016/0125647 A1 May 5, 2016

(51) Int. Cl.
G06T 19/20 (2011.01)
G06T 17/20 (2006.01)

(52) U.S. Cl.
CPC ............ *G06T 19/20* (2013.01); *G06T 17/205* (2013.01); *G06T 2219/2021* (2013.01)

(58) Field of Classification Search
CPC .................. G06T 17/10; G06T 17/00; G06T 2207/20124; G06T 2207/30012; G06T 19/20; G06T 2219/2021; G06F 17/50
See application file for complete search history.

(56) References Cited

U.S. PATENT DOCUMENTS

| 5,594,852 A * | 1/1997 | Tankelevich | G06T 11/203 345/441 |
| 2005/0168778 A1* | 8/2005 | Abe | G06F 17/211 358/1.18 |
| 2013/0262038 A1* | 10/2013 | Gary | G06F 17/50 703/1 |

* cited by examiner

*Primary Examiner* — Haixia Du

(57) ABSTRACT

A method of generating a design for a device is disclosed. The method includes electronically accessing a reference geometry representing the topology, and electronically accessing a source polygonal data model, where the source polygonal data model includes a plurality of source vertices. The method also includes modifying position characteristics of one or more of the source vertices, where the source vertices are modified so that after the source polygonal data model is subdivided, vertices in the subdivided polygonal data model corresponding with the modified source vertices conform to the reference geometry. The method also includes subdividing the source polygonal data model having the modified source vertices to generate the design, where subdividing the source polygonal data model causes vertices in the design to be positioned such that the design conforms with the reference geometry at least partly because of the modified position characteristics of the modified source vertices.

15 Claims, 20 Drawing Sheets

CONSTRAINT OF A SUBDIVIDED MODEL

BACKGROUND OF THE INVENTION

This disclosure relates in general, but not by way of limitation, to generating a polygonal data model of an object.

During the graphical design process, polygonal data of low resolution is subdivided or smoothed to generate smoother polygonal data having higher resolution. For example, a Catmull Clark subdivision operation may be performed. The subdivision operation generates additional geometries, such as vertices, edges, and faces based on the lower resolution polygonal data. The generated higher resolution polygonal data defines a surface which is similar to, but different from, the surface defined by the lower resolution polygonal data. Accordingly, while the subdivision or smoothing operation has the benefit of providing polygonal data of higher resolution, the difference between the service defined by the higher resolution polygonal data and the lower resolution polygonal data can be problematic.

BRIEF SUMMARY OF THE INVENTION

One inventive aspect is a method of generating a design for a device having a portion conforming to a known topology. The method includes electronically accessing a reference geometry representing the topology, and electronically accessing a source polygonal data model, where the source polygonal data model includes a plurality of source vertices. The method also includes modifying position characteristics of one or more of the source vertices, where the source vertices are modified so that after the source polygonal data model is subdivided, vertices in the subdivided polygonal data model corresponding with the modified source vertices conform to the reference geometry. The method also includes subdividing the source polygonal data model having the modified source vertices to generate the design, where subdividing the source polygonal data model causes vertices in the design to be positioned such that the design conforms with the reference geometry at least partly because of the modified position characteristics of the modified source vertices. The method also includes displaying a representation of the design.

Another inventive aspect is a computer system, including a processor, a display, and a memory including instructions, which, when executed cause the processor to generate a design for a device having a portion conforming to a known topology according to a method. The method includes accessing, from the memory, a reference geometry representing the topology, and accessing, from the memory, a source polygonal data model, where the source polygonal data model includes a plurality of source vertices. The method also includes modifying position characteristics of one or more of the source vertices, where the source vertices are modified so that after the source polygonal data model is subdivided, vertices in the subdivided polygonal data model corresponding with the modified source vertices conform to the reference geometry. The method also includes subdividing the source polygonal data model having the modified source vertices to generate the design, where subdividing the source polygonal data model causes vertices in the design to be petitioned such that the design conforms with the reference geometry at least partly because of the modified position characteristics of the modified source vertices, and displaying a representation of the design on the display.

Another inventive aspect is a computer readable medium including non-transient instructions, which, when executed cause the computer to generate a design for a device having a portion conforming to a known topology according to a method. The method includes accessing, from a memory of the computer, a reference geometry representing the topology, and accessing, from the memory, a source polygonal data model, where the source polygonal data model includes a plurality of source vertices. The method also includes modifying position characteristics of one or more of the source vertices, where the source vertices are modified so that after the source polygonal data model is subdivided, vertices in the subdivided polygonal data model corresponding with the modified source vertices conform to the reference geometry. The method also includes subdividing the source polygonal data model having the modified source vertices to generate the design, where subdividing the source polygonal data model causes vertices in the design to be petitioned such that the design conforms with the reference geometry at least partly because of the modified position characteristics of the modified source vertices, and displaying a representation of the design on a display.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
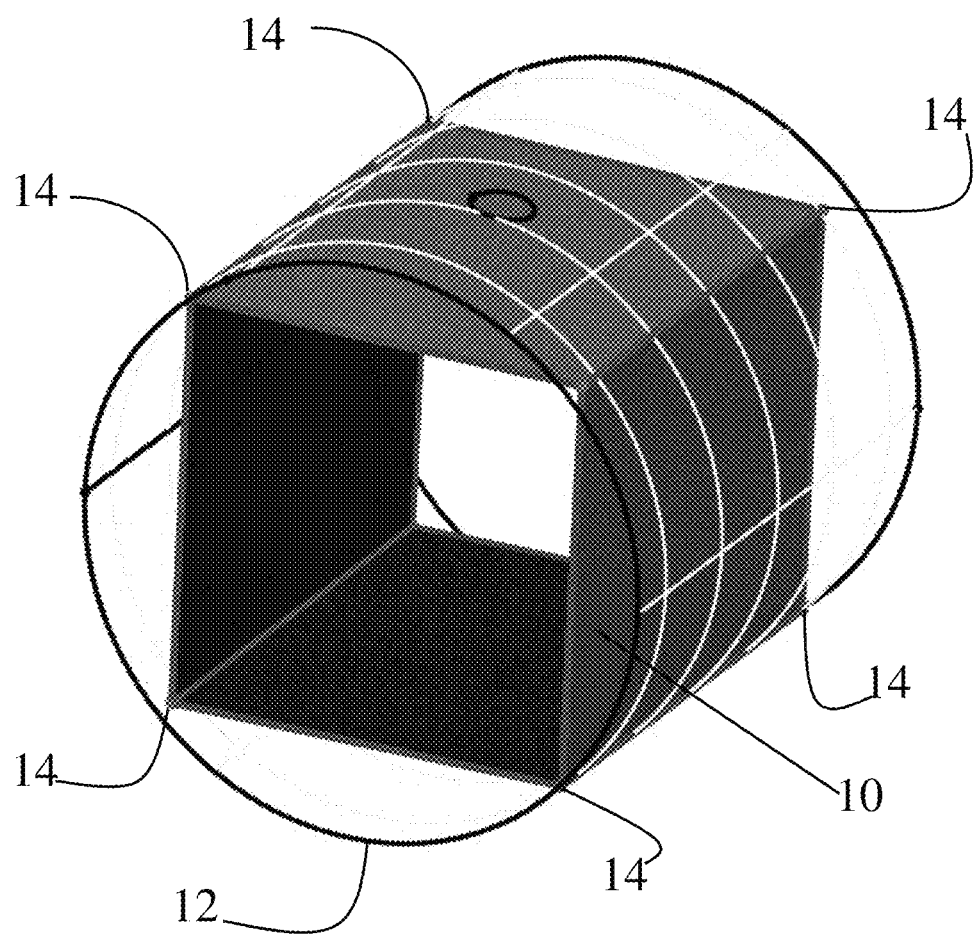
FIG. 1 is an isometric view of a polygonal data mesh and a reference geometry.

FIG. 1 is an isometric view of a polygonal data mesh 10, and a reference geometry 12.

Polygonal data mesh 10 is a relatively low resolution representation of a polygonal data model. To increase the resolution, polygonal data mesh 10 may be subdivided. In some embodiments, polygonal data mesh 10 is unsubdivided polygonal data, such as a top level control mesh. In some embodiments, polygonal data mesh 10 is a subdivided version of a higher level polygonal data mesh.

As shown, polygonal data 10 includes eight vertices 14, where each of the vertices 14 is coincident with or lies on reference geometry 12. Polygonal data 10 also includes edges connecting the vertices 14 and faces bound by edges.

The reference geometry 12 may, for example, be polygonal data having, for example, a higher resolution than the resolution of polygonal data 10. Alternatively, reference geometry 12 may be an analytic surface described, for example, with analytic equations. Reference geometry 12 is not limited and may be represented through various other constructs.

Reference geometry 12 represents a target geometry to which the subdivided version of polygonal data mesh 10 is to conform as a result of the subdivision process. To cause conformity of the subdivided version of polygonal data mesh 10 to reference geometry 12, prior to subdivision, polygonal data mesh 10 is modified. The result of the modification is subdivided, and the result of the subdivision of the modified version of original data mesh 10 approximately conforms with reference geometry 12. In some embodiments, the result of the subdivision of the modified version of original data mesh 10 substantially conforms with reference geometry 12. In some embodiments, the result of the subdivision of the modified version of original data mesh 10 is spaced apart from the reference geometry 12 by less than a maximum threshold.

FIGS. 2-6 illustrate steps which may be used to determine how polygonal data mesh 10 may be modified prior to subdivision, so that the result of multiple subdivisions of the modified polygonal data mesh 10 approximately or substantially conforms with reference geometry 12. In the process, described in more detail below, a modification vector is determined for each of the vertices 14 of polygonal data mesh 10. The modification vectors are determined iteratively by subdividing the polygonal data mesh 10, determining differences between the subdivided polygonal data mesh 10 and the reference geometry 12, and generating the modification vectors based on the differences. The iterative process continues for a determined number of iterations, or until a desired conformity is achieved.

Figure 2:
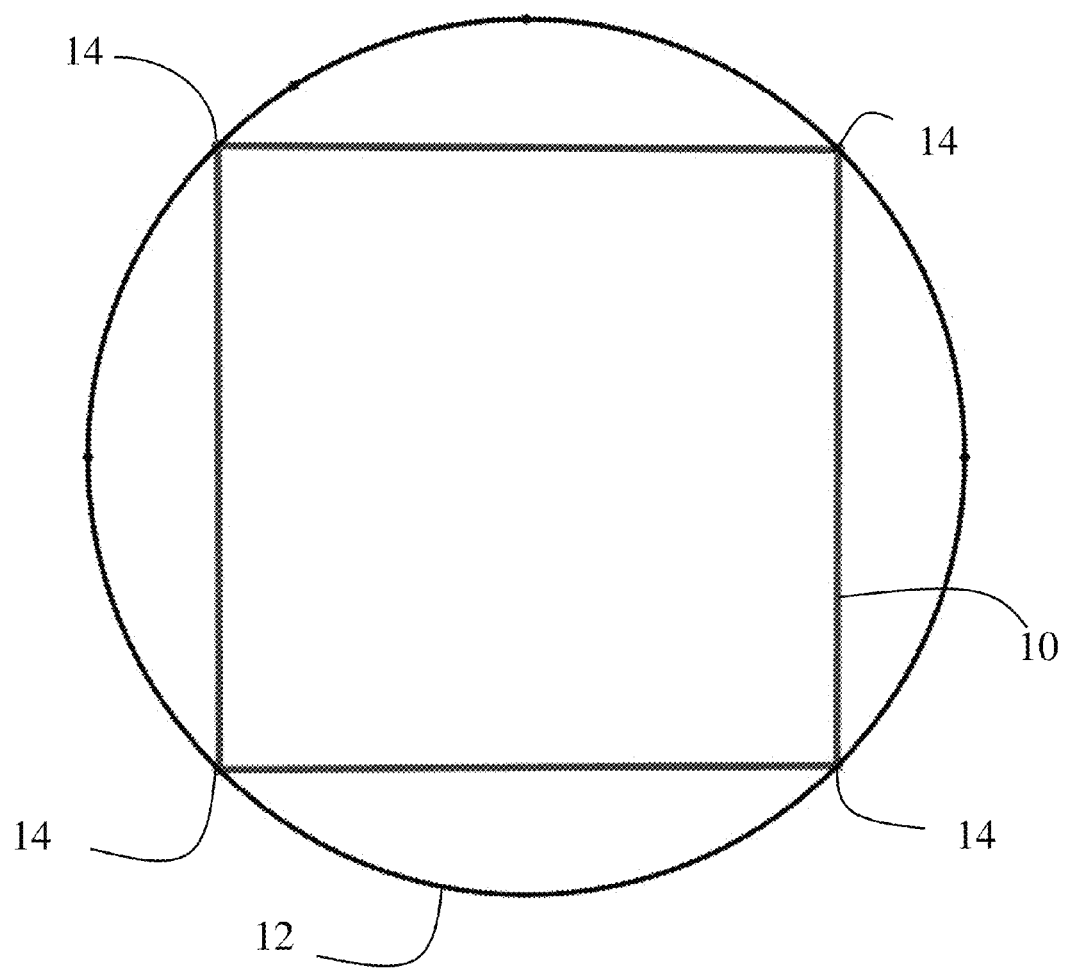
FIGS. 2-6 illustrate steps which may be used to determine how a polygonal data mesh may be modified prior to subdivision.

FIG. 2 is a two dimensional view of polygonal data mesh 10, reference geometry 12, and vertices 14. To simplify explanation, the discussion below is directed to two dimensional data. The aspects and principles discussed are analogously applied to data of higher dimensions, such as 3, 4, 5, or more dimensions. As shown, polygonal data mesh 10 has not been subdivided, and has not been modified in preparation for subdivision.

Figure 3:
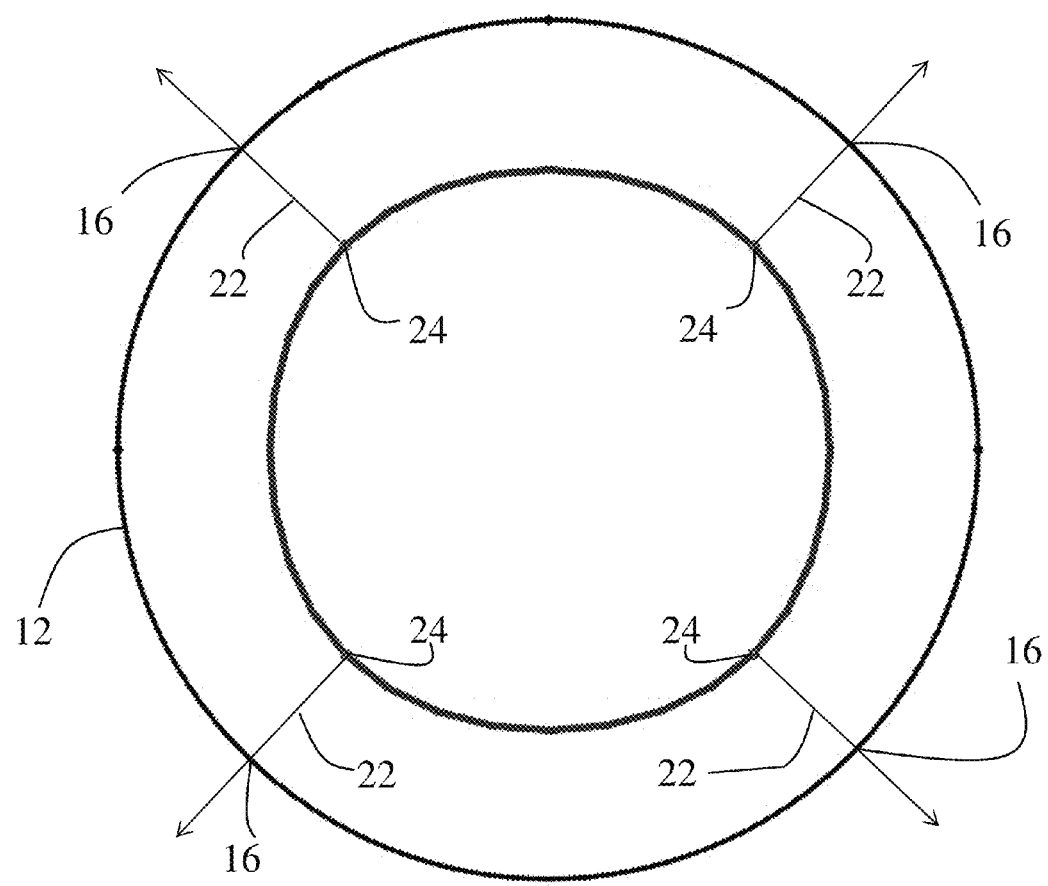

FIG. 3 is a two dimensional view of a polygonal data mesh 20, which is the result of multiple subdivisions of the polygonal data mesh 10 of FIG. 2 without modification. As a result of the multiple subdivisions, polygonal data mesh 20 includes numerous vertices and numerous edges, where each edge connects adjacent vertices. Four vertices 24 correspond with vertices 14 of polygonal data mesh 10 of FIG. 2. As corresponding with vertices 14, vertices 24 may be understood as being vertices 14 having been moved to new locations by the subdivision process. In contrast, the additional vertices (not indicated in FIG. 2) of polygonal data mesh 20 were generated by the subdivision process. Locations 16 indicate positions of vertices 14 of polygonal data mesh 10 prior to subdivision.

Modification vectors for vertices 14 may be determined based on the difference between the locations of vertices 24 and reference geometry 12.

The direction of each modification vector may be determined, for example, based on a ray 22 beginning at each vertex 24 and passing through the location 16 corresponding with the vertex 24 associated with the vertex 24. In some embodiments, the direction of each modification vector is the direction defined by the corresponding ray 22. In some embodiments, the direction of each modification vector varies from the direction defined by the corresponding ray 22, and may be based on other geometries of at least one of the reference geometry 12, the polygonal data mesh 10, and the polygonal data mesh 24.

The magnitude of each modification vector may be determined, for example, based on the distance between each vertex 24 and the corresponding location 16. In some embodiments, locations 16 is not coincident with the reference geometry 12. In such embodiments, the magnitude of each modification vector may be determined, for example, based on the distance between each vertex 24 and a corresponding location on the reference geometry, where the corresponding location on the reference geometry is determined to be the point on the reference geometry nearest the vertex 24 in the direction of ray 22. In some embodiments, the magnitude of each modification vector is equal to or is substantially equal to the magnitude of the distance between each vertex 24 and the corresponding location on the reference geometry. In some embodiments, the magnitude of each modification vector varies from the magnitude of the distance between each vertex 24 and the corresponding location on the reference geometry, and is based on other geometries of at least one of the reference geometry 12, the polygonal data mesh 10, and the polygonal data mesh 20. In some embodiments, the magnitude of each modification vector varies the magnitude of the distance each vertex 24 and the corresponding location on the reference geometry by a constant distance or by a constant factor.

Figure 4:
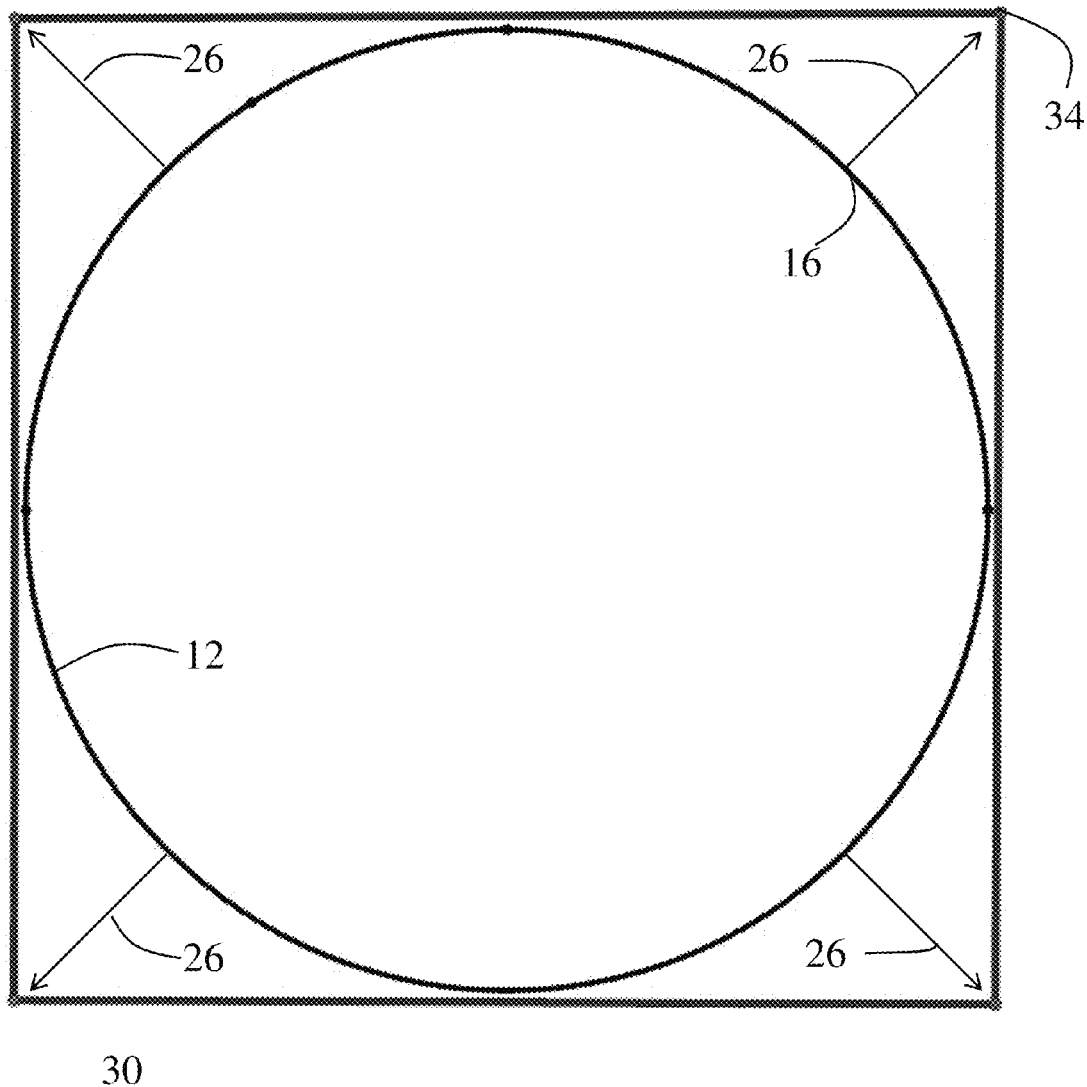

FIG. 4 is a two dimensional view of a polygonal data mesh 30 and reference geometry 12. Polygonal data mesh 30 is generated as the result of modifying the vertices 14 of polygonal data mesh 10 of FIG. 2 based on modification vectors 26. The modification vectors 26 may be determined, for example, as discussed above with reference to FIG. 3.

FIG. 4 also identifies locations 16 which indicate positions of unmodified vertices 14 of polygonal data mesh 10. As shown, the differences between unmodified vertices 14 of polygonal data mesh 10 and corresponding vertices 34 of polygonal data mesh 30 are respectively defined by the corresponding modification vectors 26.

Figure 5:
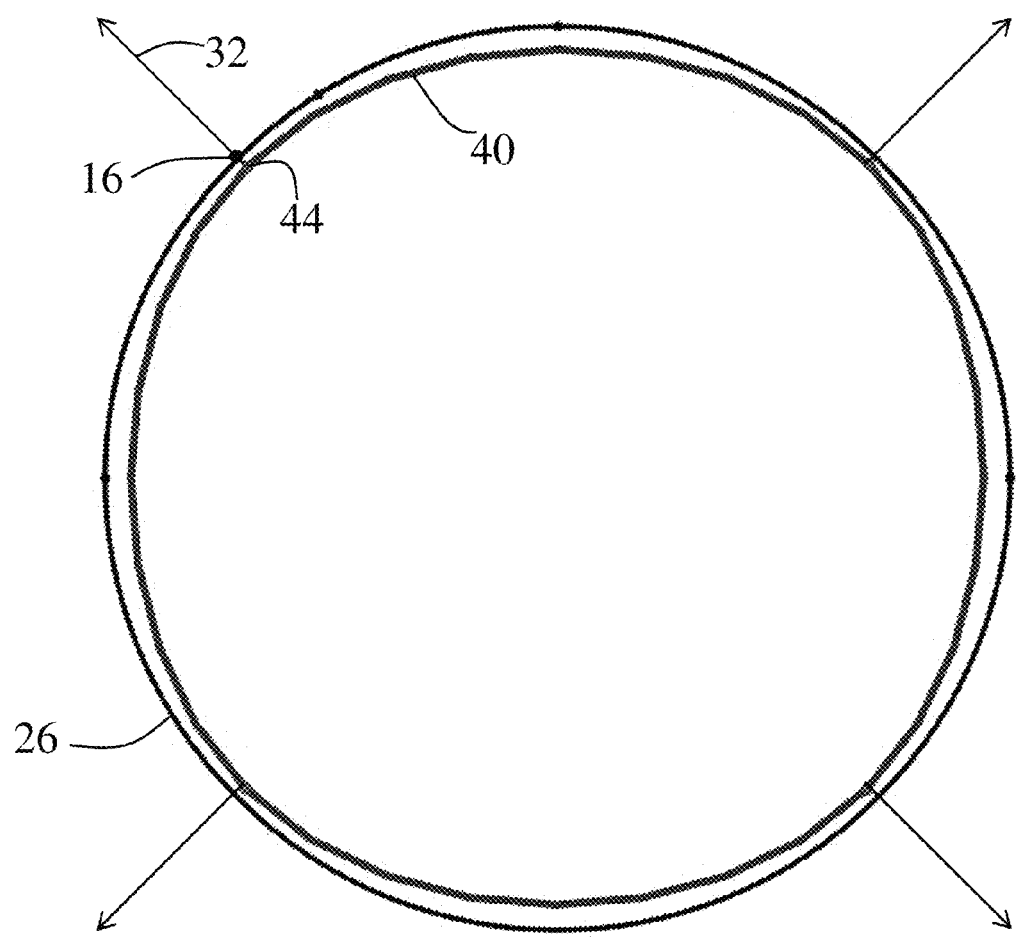

FIG. 5 is a two dimensional view of a polygonal data mesh 40, which is the result of multiple subdivisions of the polygonal data mesh 20 of FIG. 4. As a result of the multiple subdivisions, polygonal data mesh 40 includes numerous vertices and numerous edges, where each edge connects adjacent vertices. Four vertices 44 correspond with vertices 14 of polygonal data mesh 10 of FIG. 2 and with vertices 34 of polygonal data mesh 30 of FIG. 4. As corresponding with vertices 14 and 34, vertices 44 may be understood as being vertices 14 or 34 having been moved to new locations by the subdivision process and the modification vectors. In contrast, the additional vertices (not indicated in FIG. 2) of polygonal data mesh 20 were generated by the subdivision process. Locations 16 indicate positions of vertices 14 of polygonal data mesh 10 of FIG. 2.

Comparing FIG. 5 and FIG. 3 reveals that the polygonal data mesh 40, generated by subdividing the modified polygonal data mesh 20 is significantly more conformant to reference geometry 12 than polygonal data mesh 20, generated by subdividing the unmodified polygonal data mesh 10.

To further improve conformity, modification vectors for vertices 14 may be updated based on the results of the subdivision of polygonal data mesh 30. The updated modification vectors may be determined based on the difference between the locations of vertices 44 and reference geometry 12. For example, the modification vectors may be updated by the addition of an update vector thereto. The determination of the update vector may be similar to the determination of the modification vectors described above with reference to FIG. 3. Other equivalent or similar processes for updating the modification vectors may also be used.

Figure 6:
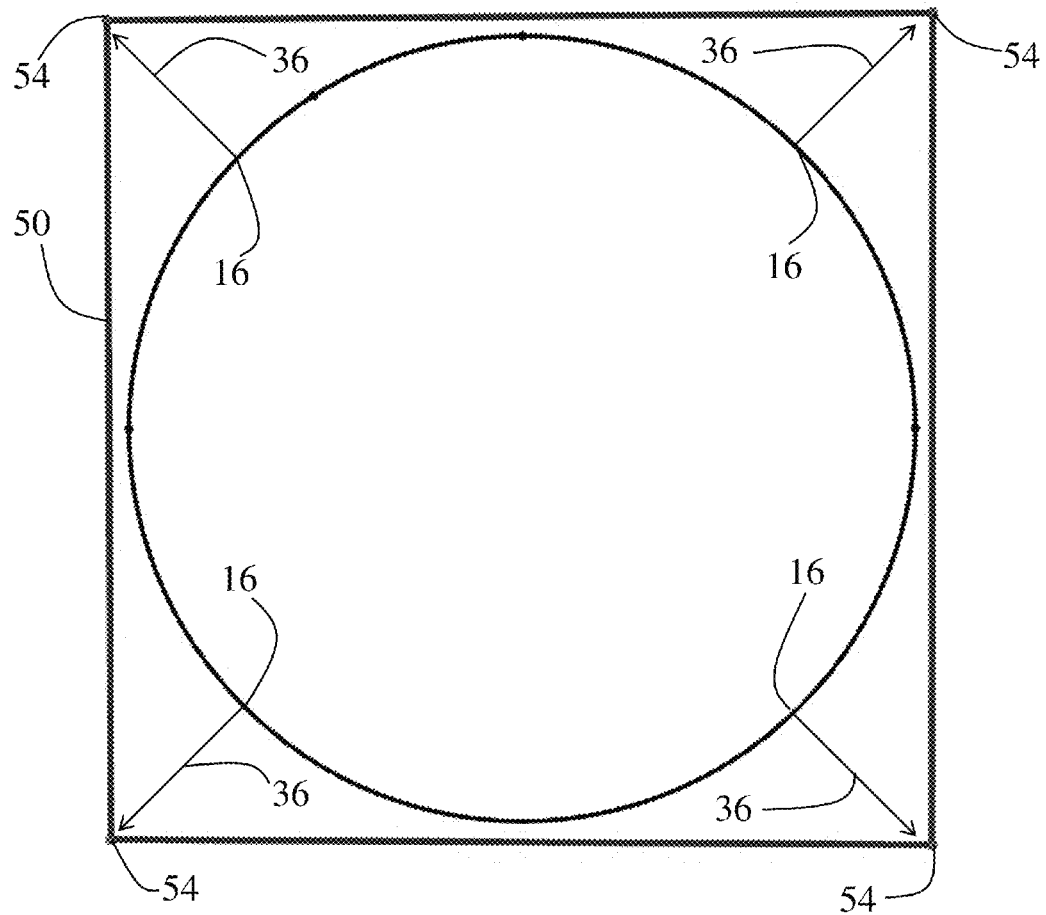

FIG. 6 is a two dimensional view of a polygonal data mesh 50 and reference geometry 12. Polygonal data mesh 50 may be generated as the result of modifying the vertices 14 of polygonal data mesh 10 of FIG. 2 based on modification vectors 36. The modification vectors 36 may be determined, for example, as discussed above with reference to FIG. 5. In some embodiments, polygonal data mesh 50 may be generated as the result of modifying the vertices 34 of polygonal data mesh 30 of FIG. 4 based on update vectors. The update vectors may, for example, be calculated based on the difference between positions of vertices 44 of polygonal data mesh 40 of FIG. 5 and locations 16.

FIG. 6 also identifies locations 16 which indicate positions of unmodified vertices 14 of polygonal data mesh 10. As shown, the differences between unmodified vertices 14 of polygonal data mesh 10 and corresponding vertices 54 of polygonal data mesh 50 are respectively defined by the corresponding modification vectors 36.

The process of modifying the vertex positions prior to subdivision may continue a predetermined number of iterations, or may continue until a desired conformity is achieved. The desired conformity may, for example, be measured by an absolute distance between reference geometry 12 and a subdivided polygonal data mesh. In some embodiments, desired conformity may, for example, be determined based on an improvement of conformity between the results of the current iteration and either a next previous iterations or an initial subdivision. Other methods of measuring and determining adequate conformity may alternatively or additionally be used.

FIGS. 2-6 illustrate steps which may be used to determine how polygonal data mesh may be modified prior to subdivision, so that the result of multiple subdivisions of the modified polygonal data mesh approximately conforms with a reference geometry. In some embodiments, polygonal data mesh 10 is generated by a subdivision process.

In some embodiments, modification vectors are generated for vertices of a subdivided polygonal data mesh. In such embodiments, modification vectors may be generated for vertices that are created by the most recent or greatest resolution subdivision of polygonal data mesh 10. Additionally or alternatively, modification vectors may be generated for vertices that correspond with vertices created by a previous or lesser resolution subdivision of polygonal data mesh 10, or for vertices that correspond with vertices of the unsubdivided polygonal data mesh 10. As corresponding with vertices created by a previous or lesser resolution subdivision, the corresponding vertices may be understood as being the vertices created by the previous or lesser resolution subdivision having been moved to new locations by the subdivision process and the modification vectors.

Figure 7:
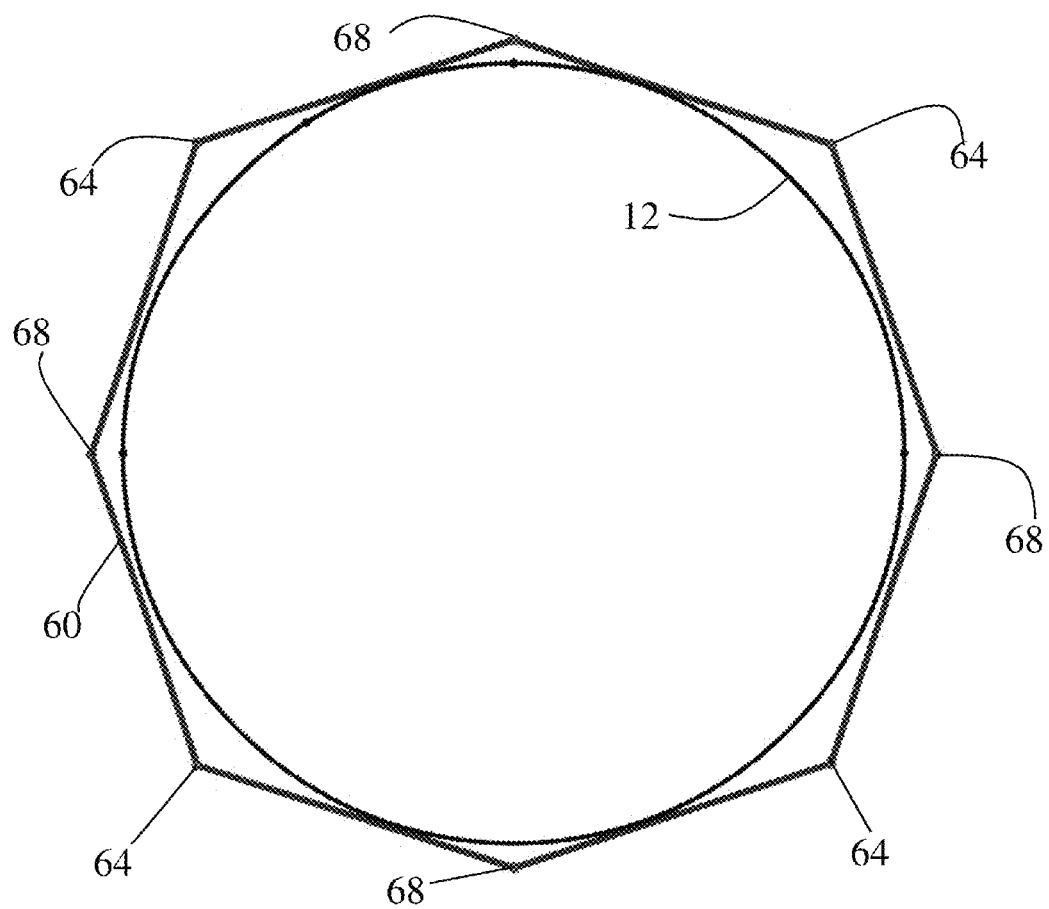
FIG. 7 is a two dimensional view of a polygonal data mesh and a reference geometry.

FIG. 7 is a two dimensional view of a polygonal data mesh 60 and reference geometry 12. Polygonal data mesh 60 is generated as the result of subdividing polygonal data mesh 50 of FIG. 6 once. As shown, polygonal data mesh 60 includes vertices 64 and vertices 68.

Vertices 64 correspond with vertices 54 of polygonal data mesh 50 of FIG. 6, which correspond with vertices 14 of polygonal data mesh 10 of FIG. 2, where the correspondence is similar to that discussed elsewhere herein. Accordingly, the positions of vertices 64 are determined by the positions of vertices 14 of polygonal data mesh 10 of FIG. 2 as modified by modification vectors prior to subdivision.

Vertices 68 are generated by the subdivision process. To further improve the conformity of the multiply subdivided polygonal data mesh with reference geometry 12, vertices 68 may be modified based on modification vectors. Additionally or alternatively, vertices 64 may be modified based on modification vectors.

Figure 8:
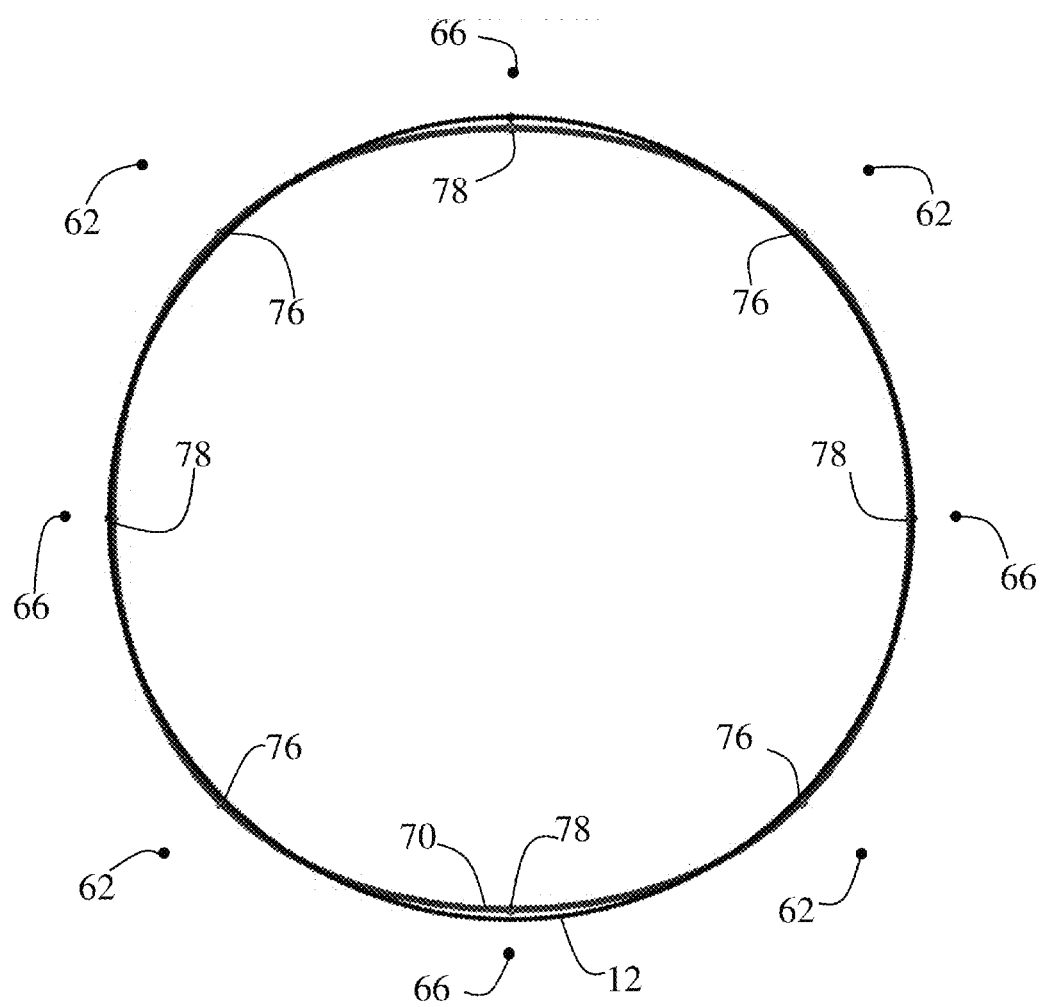
FIG. 8 is a two dimensional view of a polygonal data mesh, which is the result of multiple subdivisions of the polygonal data mesh of FIG. 7 without modification.

FIG. 8 is a two dimensional view of a polygonal data mesh 70, which is the result of multiple subdivisions of the polygonal data mesh 60 of FIG. 7 without modification. As a result of the multiple subdivisions, polygonal data mesh 70 includes numerous vertices and numerous edges, where each edge connects adjacent vertices. Four vertices 78 correspond with vertices 68 of polygonal data mesh 60 of FIG. 7. As corresponding with vertices 68, vertices 78 may be understood as being vertices 68 having been moved to new locations by the subdivision process and the modification vectors. Four vertices 76 correspond with vertices 64 of polygonal data mesh 60 of FIG. 7. As corresponding with vertices 64, vertices 76 may be understood as being vertices 64 having been moved to new locations by the subdivision process and the modification vectors. In contrast, the additional vertices (not indicated in FIG. 8) of polygonal data mesh 70 were generated by the subdivision process. Locations 66 indicate positions of vertices 68 of polygonal data mesh 60 prior to subdivision. Locations 62 indicate positions of vertices 64 of polygonal data mesh 60 prior to subdivision.

Modification vectors for vertices 68 may be determined based on the difference between the locations of vertices 78 and reference geometry 12. For example, calculation of modification vectors for vertices 68 may be similar to the calculations described above with reference to FIG. 3, of modification vectors for vertices 14.

Modification vectors for vertices 64 may be determined based on the difference between the locations of vertices 76 and reference geometry 12. For example, calculation of modification vectors for vertices 64 may be similar to the calculations described above with reference to FIG. 3, of modification vectors for vertices 14.

Figure 9:
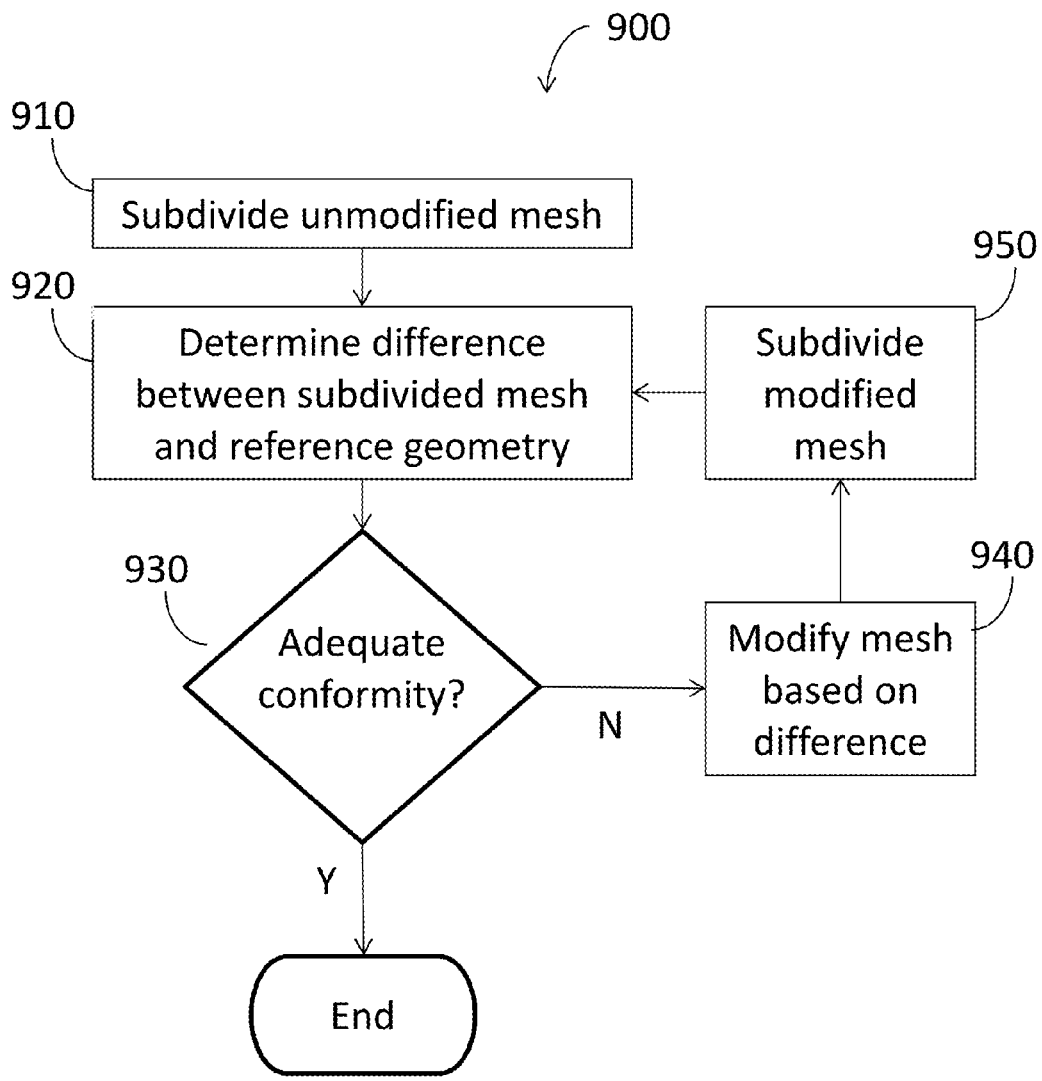
FIG. 9 is a flowchart illustrating a method of subdividing a source polygonal data mesh according to some embodiments.

FIG. 9 is a flowchart illustrating a method 900 of subdividing a source polygonal data mesh according to some embodiments. In the method 900, the source polygonal data mesh is modified so as to conform with a reference geometry. The various steps of method 900 may include features and characteristics of corresponding actions described elsewhere herein. In addition, the corresponding actions described elsewhere herein may additionally or alternatively include features and characteristics of the various steps of method 900.

At 910, the source polygonal data mesh is multiply subdivided. For example, if the source polygonal data mesh is to be used in a model which uses eight subdivision levels, the source polygonal data mesh may be subdivided eight times.

At 920, a difference between the multiply subdivided polygonal data mesh and the reference geometry is determined. For example, locations of geometries of the multiply subdivided mesh may be compared with corresponding locations on the reference geometry.

At 930, a determination is made as to whether the multiply subdivided polygonal data mesh adequately conforms with the reference geometry. If the multiply subdivided polygonal data mesh adequately conforms with the reference geometry, the method ends.

If the multiply subdivided polygonal data mesh does not adequately conform with the reference geometry, at 940, the source polygonal data mesh is modified based on the difference determined at 920.

At 950, the modified source polygonal data mesh is multiply subdivided, and the method continues to 920.

Figure 10:
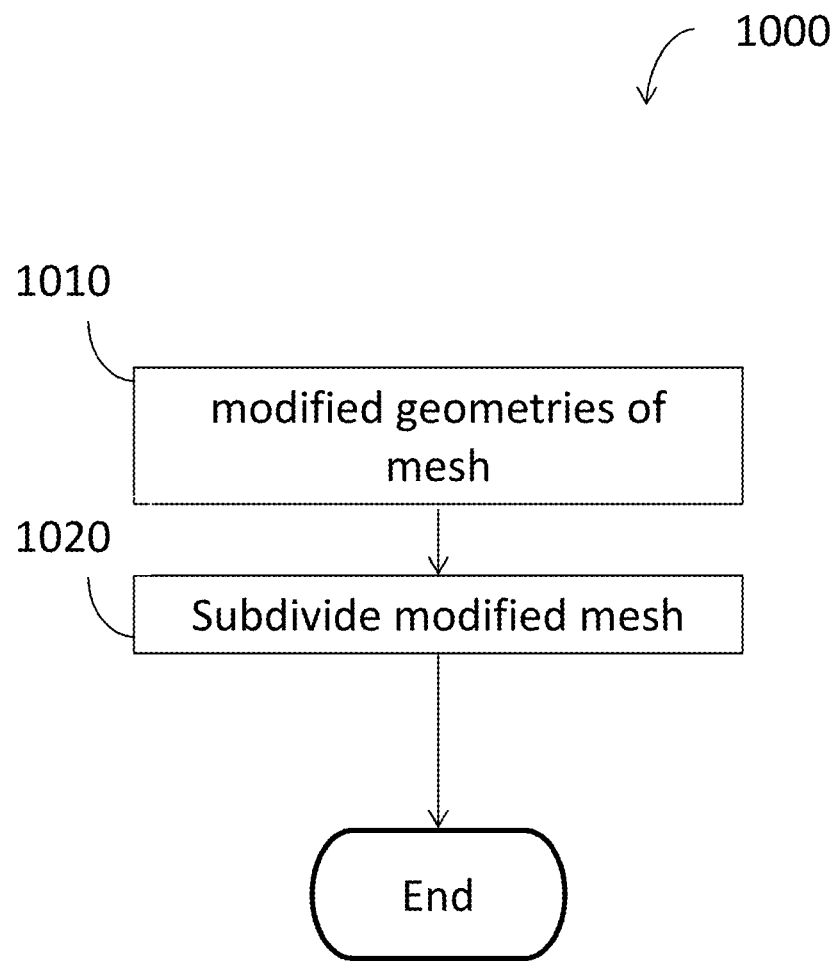
FIG. 10 is a flowchart illustrating a method of subdividing a source polygonal data mesh according to some embodiments.

FIG. 10 is a flowchart illustrating a method 1000 of subdividing a source polygonal data mesh according to some embodiments. In the method 1000, the source polygonal data mesh is modified so as to conform with a reference geometry. The various step of method 1000 may include features and characteristics of corresponding actions and step described elsewhere herein. In addition, the corresponding actions described elsewhere herein may additionally or alternatively include features and characteristics of the various steps of method 1000.

At 1010, the source polygonal data mesh is modified so that subsequent subdivision generates polygonal data conforming to the reference geometry. In some embodiments, the source polygonal data mesh is modified according to features and characteristics of steps and actions described elsewhere. At 1020, the modified polygonal data mesh is subdivided.

Advantages of the embodiments are applicable to many situations. For example, the reference geometry may represent a companion structure to which a designed part is to mate. The reference geometry accordingly has the geometric characteristics and topology of the companion structure. Because the subdivided polygonal data mesh conforms with the reference geometry, the device being designed with the polygonal data mesh will conform with the topology of the companion structure. The advantages of the embodiments are particularly beneficial if the subdivision manages the transition between the portion of the designed device conforming to the companion structure and the remainder of the device.

FIGS. 11-17 illustrate stages of a method of managing the position between the designed device and the reference geometry representing the companion structure.

Figure 11:
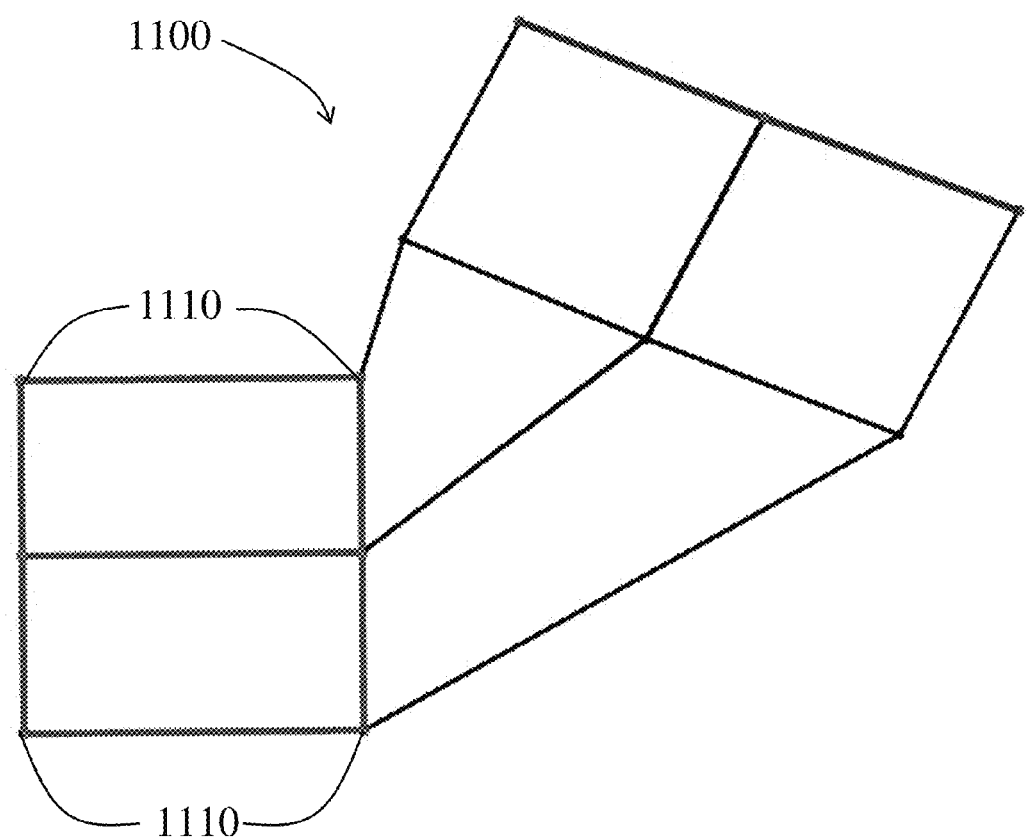
FIGS. 11-17 illustrate stages of a method of managing the position between the designed device and the reference geometry representing the companion structure.

FIG. 11 illustrates a polygonal data mesh 1100, which represents a device being designed, where the portion of polygonal data mesh 1100 including vertices 1110 should conform with a companion structure.

Figure 12:
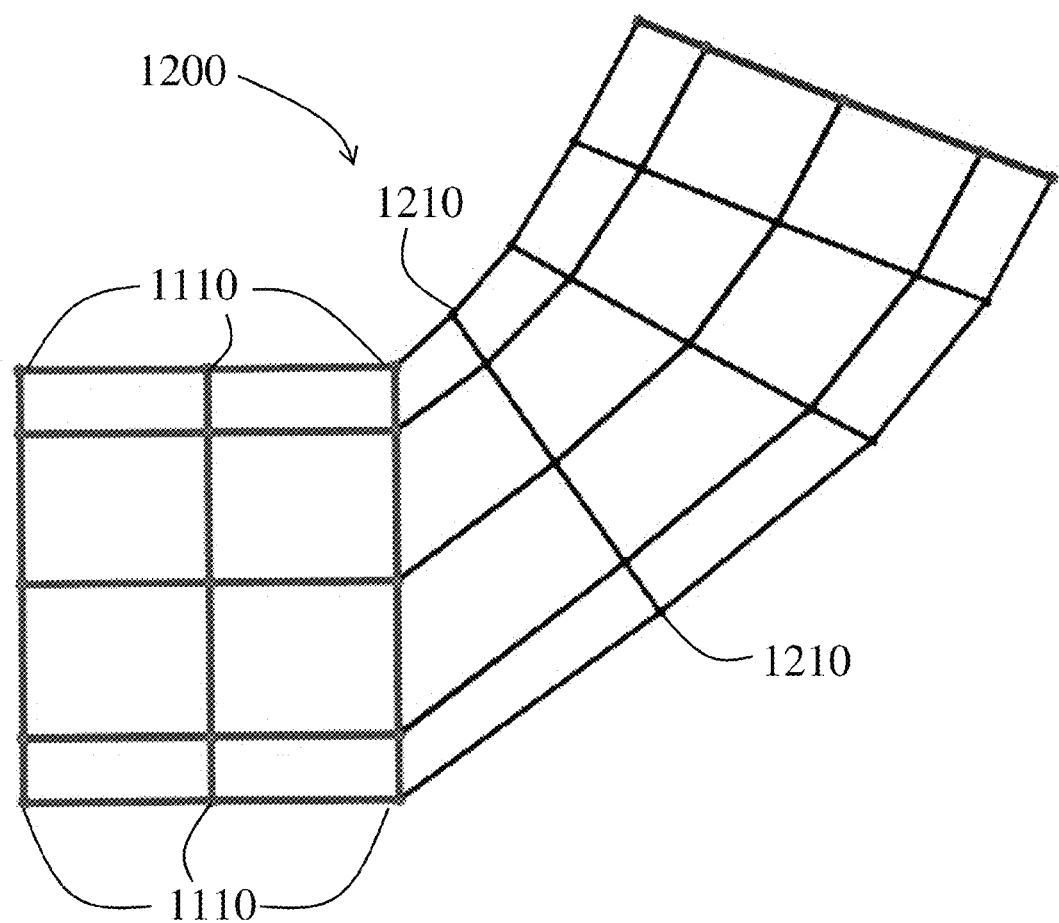
Figure 13:
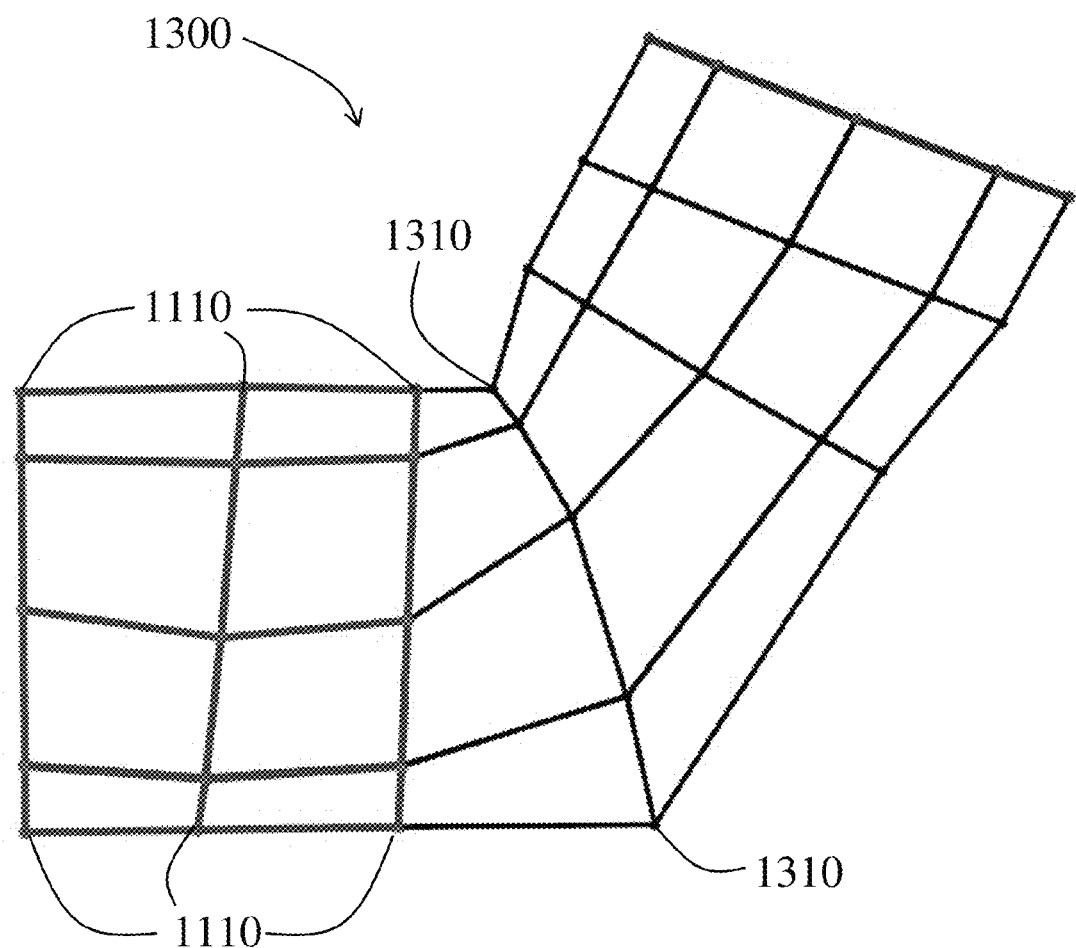

FIGS. 12 and 13 respectively illustrate polygonal data meshes 1200 and 1300, which are generated by subdividing polygonal data mesh 1100 once. Polygonal data mesh 1200 is generated by subdivision without transition management, and polygonal data mesh 1300 is generated by subdivision with transition management. As shown, the portions of polygonal data meshes 1200 and 1300 including vertices 1110, after subdivision, maintain the shape defined by vertices 1110 of polygonal data mesh 1100 prior to subdivision. As shown in FIG. 13, because of the transition management, vertices 1310, which are immediately adjacent vertices 1110, maintain the tangency defined by vertices 1110. In contrast, as shown in FIG. 12, because polygonal data mesh 1200 is generated by subdividing without transition management, vertices 1210, which are immediately adjacent vertices 1100, do not maintain the tangency defined by vertices 1110.

Figure 14:
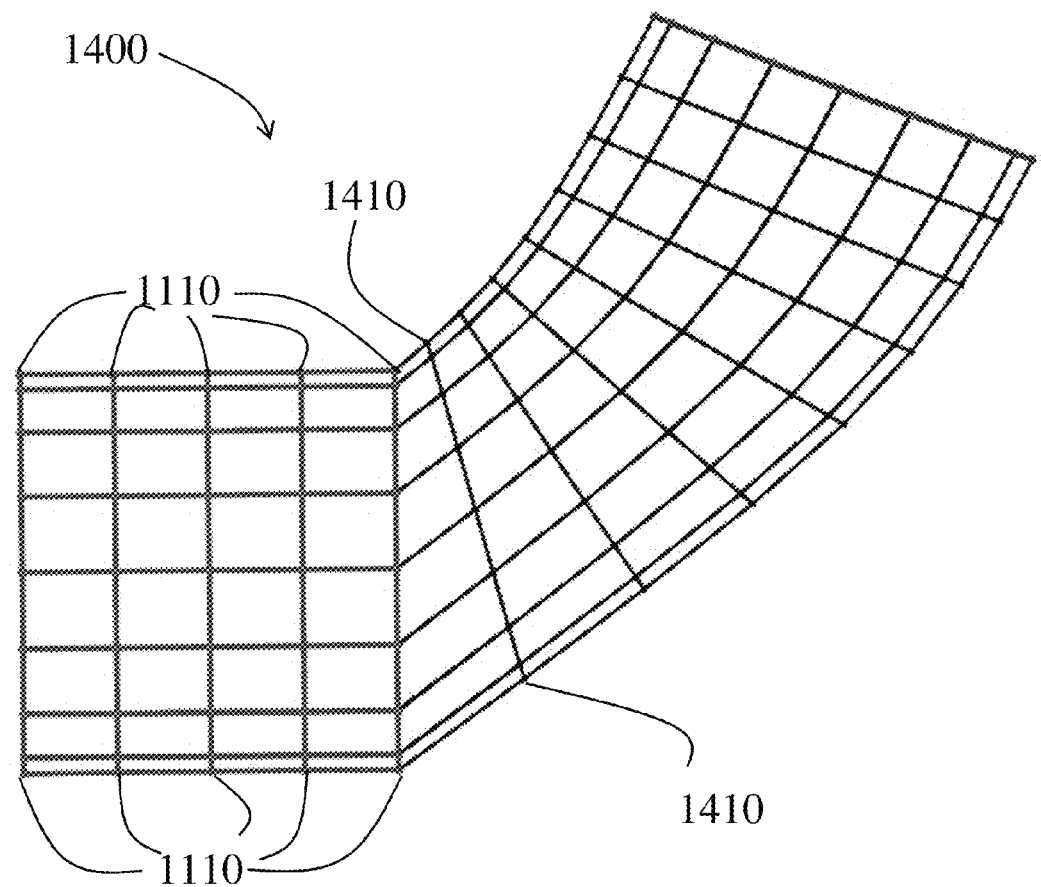
Figure 15:
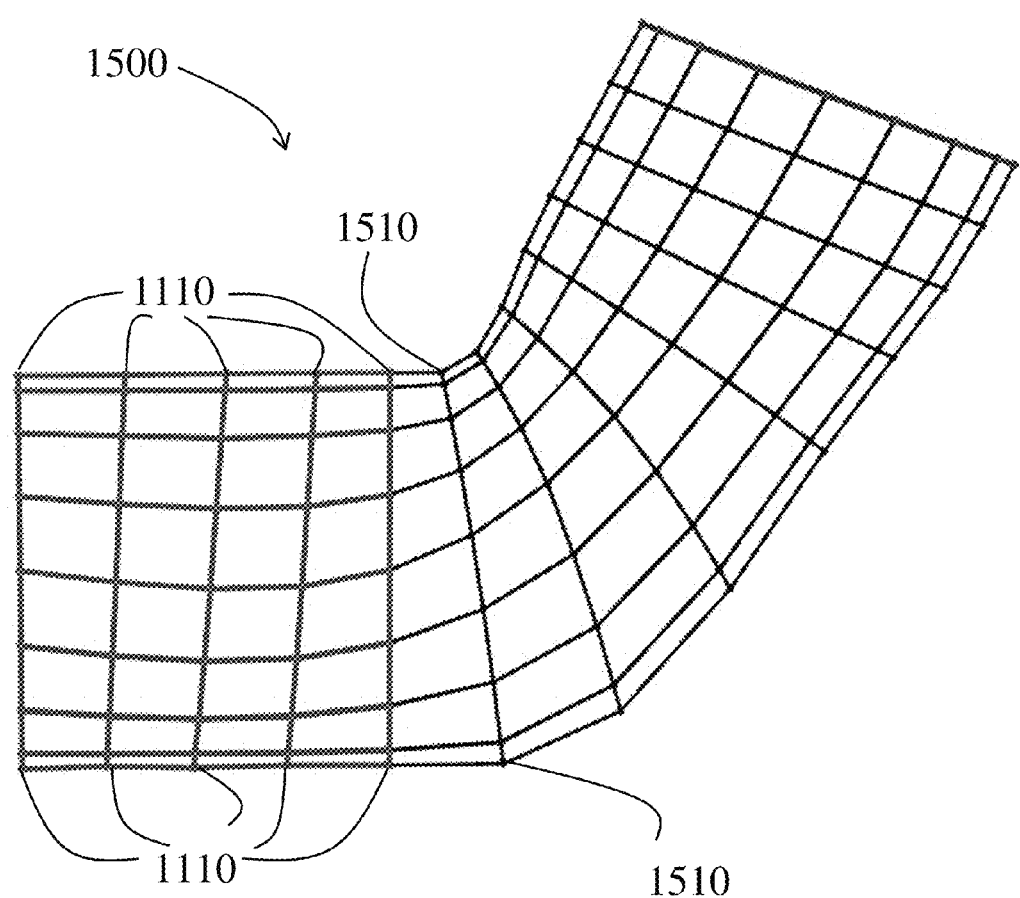

FIGS. 14 and 15 respectively illustrate polygonal data meshes 1400 and 1500, which are respectively generated by subdividing polygonal data mesh 1100 twice. Polygonal data mesh 1400 is generated by subdivision without transition management, and polygonal data mesh 1500 is generated by subdivision with transition management. As shown, the portions of polygonal data meshes 1400 and 1500 including vertices 1110, after subdivision, maintain the shape defined by vertices 1110 of polygonal data mesh 1100 prior to subdivision. As shown in FIG. 15, because of the transition management, vertices 1510, which are immediately adjacent vertices 1110, maintain the tangency defined by vertices 1110. In contrast, as shown in FIG. 14, because polygonal data mesh 1400 is generated by subdividing without transition management, vertices 1410, which are immediately adjacent vertices 1100, do not maintain the tangency defined by vertices 1110.

Figure 16:
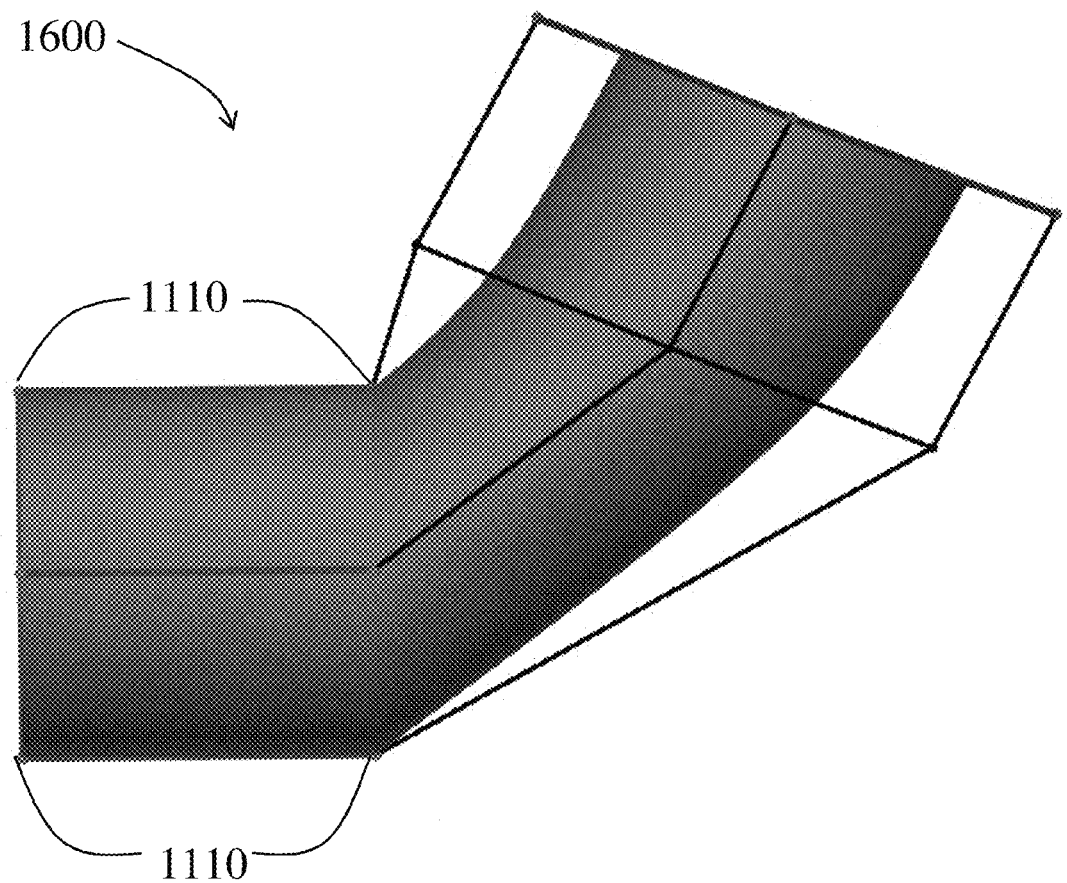
Figure 17:
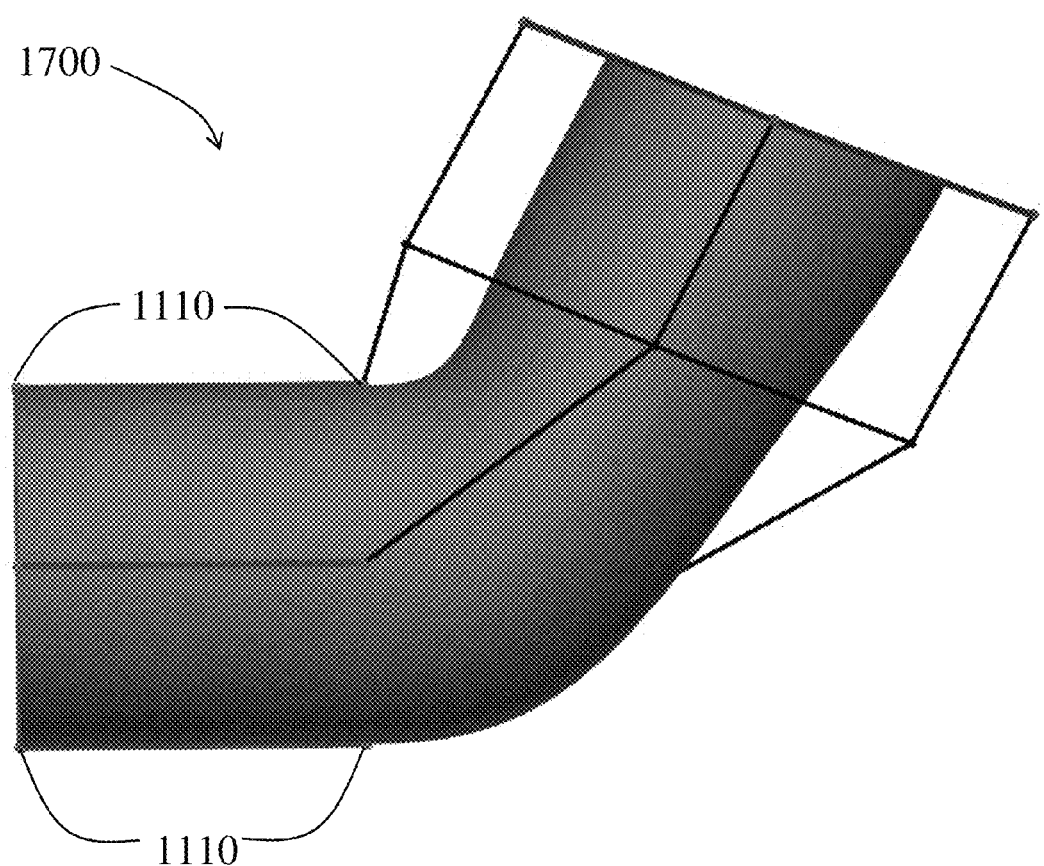

FIGS. 16 and 17 respectively illustrate polygonal data meshes 1600 and 1700, which are respectively generated by subdividing polygonal data mesh 1100 many times. Polygonal data mesh 1600 is generated by subdivision without transition management, and polygonal data mesh 1700 is generated by subdivision with transition management. As shown, the portions of polygonal data meshes 1600 and 1700 including vertices 1110, after subdivision, maintain the shape defined by vertices 1110 of polygonal data mesh 1100 prior to subdivision. As shown in FIG. 17, because of the transition management, polygonal data mesh 1700 includes a smooth transition between the conforming portion of polygonal data mesh 1700 and the nonconforming portion of polygonal data mesh 1700. In contrast, as shown in FIG. 16, because polygonal data mesh 1600 is generated by subdividing without transition management, polygonal data mesh 1600 includes a sharp transition between the conforming portion of polygonal data mesh 1600 and the nonconforming portion of polygonal data mesh 1600.

Figure 18:
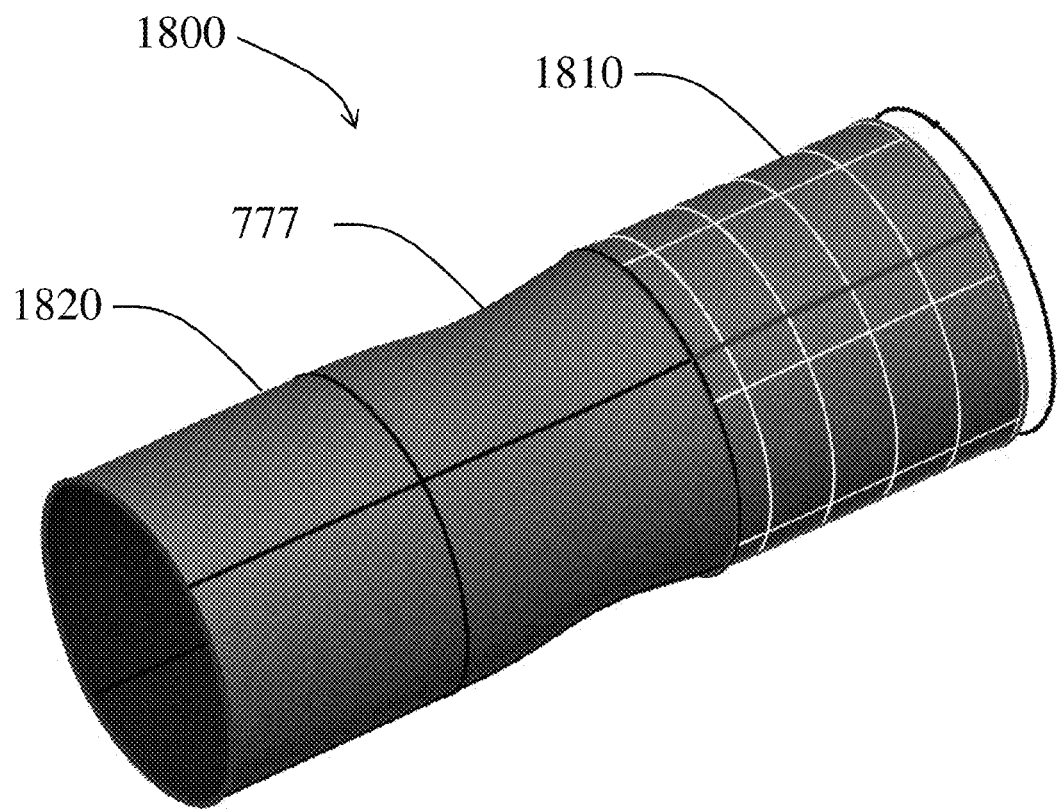
FIGS. 18 and 19 respectively illustrate polygonal data meshes, which are both generated with transition management.
Figure 19:
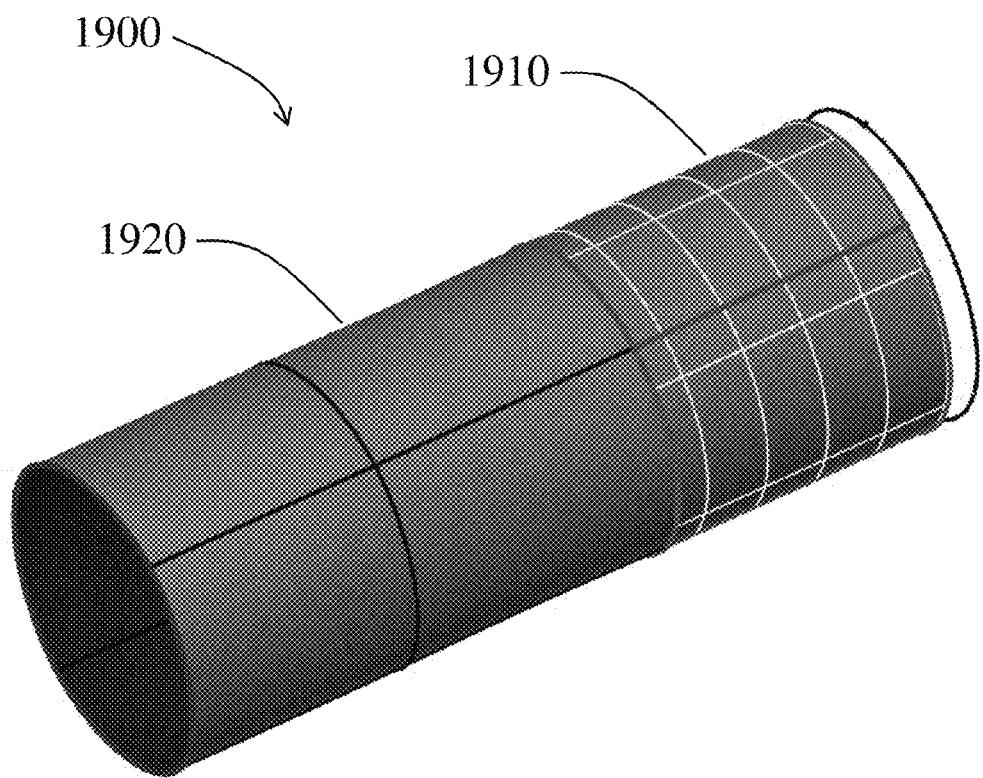

FIGS. 18 and 19 respectively illustrate polygonal data meshes 1800 and 1900, which are both generated with transition management. As shown, both polygonal data meshes 1800 and 1900 have smooth transitions between the conforming portions 1810 and 1910 and nonconforming portions 1820 and 1920.

However, the polygonal data mesh 1800 is generated with a method of subdivision not having the aspects and characteristics of the embodiments discussed herein. While polygonal data mesh 1800 conforms with a reference geometry, the subdivision process also generates an undesirable bowing 777 in the resultant polygonal data mesh 1800. In contrast, the polygonal data mesh 1900 is generated with a method of subdivision having aspects and characteristics of the embodiments discussed herein. As shown, polygonal data mesh 1900 conforms with a reference geometry and does not generate bowing.

Figure 20:
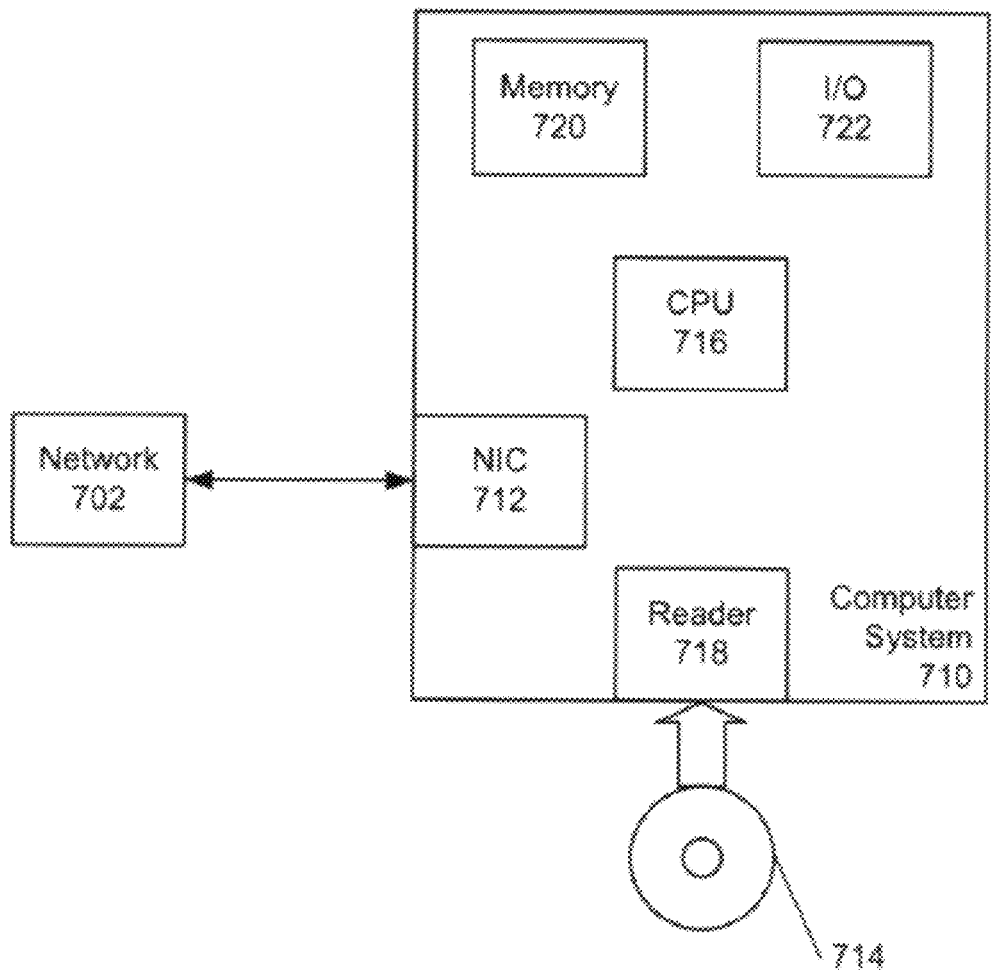
FIG. 20 shows a configuration of a computer system constructed in accordance with the present disclosure.

With reference now to FIG. 20, a configuration for a computer system 710 constructed in accordance with the present disclosure to perform the operations disclosed herein is shown. The computer system 710 can comprise a system such as a personal computer or server computer or the like. The computer system 710 may include a network communication interface 712 that permits communications with a network 702. The network interface can comprise a network interface card (NIC). The computer system 710 can execute instructions to provide a computer system which performs various aspects and principles of the methods and features described herein. For example, each of these may be implemented by one or more of the computer systems 710.

The computer system 710 includes a central processor unit 716 (CPU) and a program product reader 718 for receiving a program product media and reading program instructions recorded thereon, where the instructions, when executed by the computer cause the computer to perform various aspects and principles of the methods and features described herein. The computer system also includes associated memory 720 and input/output facilities 722, such as a display for output and a keyboard and/or mouse for input. The processor 716 of the computer system 710 can receive program instructions into the program memory of the processor. The program instructions can be received directly, such as by flashing EEPROM of the processor, or can be received through the network interface 712, such as by download from a connected device or over a WAN or LAN network communication. If desired, the program instructions can be stored on a computer program product 714 that is read by the computer system 710 so that the program instructions can thereafter executed. That is, the program product 714 is for use in a system such as the computer system 710, wherein the program product comprises a tangible, non-transitory recordable media containing a program of computer-readable instructions that are executable by the device processor 704 to perform the operations described herein. The program product 714 can comprise, for example, optical program media such as CD or DVD data discs, or flash memory drives, or external memory stores, or floppy magnetic disks, and the like.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

The various results of embodiments described herein may be stored in memory 720. Additionally, graphical representations of the various results of the embodiments may be presented using input/output facilities 722.

While the principles of the disclosure have been described above in connection with specific apparatuses and methods, it is to be clearly understood that this description is made only by way of example and not as limitation on the scope of the disclosure.

What is claimed is:

1. A method of designing a part having a portion conforming to a companion structure having a known topology, the method comprising:

electronically accessing a reference geometry representing the topology;

electronically accessing a source polygonal data model, wherein the source polygonal data model comprises a plurality of source vertices;

generating modification vectors based on data generated by subdividing the source polygonal data model;

modifying position characteristics of one or more of the source vertices, wherein the position characteristics are modified based on the modification vectors, wherein the source vertices are modified so that after the source polygonal data model is subdivided, vertices in the subdivided polygonal data model corresponding with the modified source vertices conform to the reference geometry;

after modifying the source vertices, subdividing the source polygonal data model having the modified source vertices to generate the designed part, wherein subdividing the source polygonal data model causes vertices in the designed part to be positioned such that the designed part is spaced apart from the reference geometry by less than a maximum threshold at least partly because of the modified position of the modified source vertices; and displaying a representation of the designed part.

2. The method of claim 1, wherein the designed part comprises vertices approximately on the reference geometry.

3. The method of claim 1, wherein generating the modification vectors comprises:

subdividing the source polygonal data model; and determining a first difference vector representing a difference of a position of a vertex of the subdivided data model and the reference geometry.

4. The method of claim 3, wherein generating the modification vectors comprises:

modifying the source polygonal data model based on the difference vector;

subdividing the modified source polygonal data model; and determining a second difference vector representing a difference of a position of a vertex of the subdivided modified source polygonal data model and the reference geometry.

5. The method of claim 1, wherein one or more of the modified source vertices is generated by subdivision.

6. The method of claim 1, wherein one or more of the modified source vertices is generated by subdivision of more than one level.

7. The method of claim 1, wherein one or more of the modified source vertices is not generated by subdivision.

8. A computer system, comprising:

a processor;

a display; and a memory comprising instructions, which, when executed cause the processor to generate a designed part having a portion conforming to a companion structure having a known topology according to a method comprising:

accessing, from the memory, a reference geometry representing the topology, accessing, from the memory, a source polygonal data model, wherein the source polygonal data model comprises a plurality of source vertices, generating modification vectors based on data generated by subdividing the source polygonal data model;

modifying position characteristics of one or more of the source vertices, wherein the position characteristics are modified based on the modification vectors, wherein the source vertices are modified so that after the source polygonal data model is subdivided, vertices in the subdivided polygonal data model corresponding with the modified source vertices conform to the reference geometry, after modifying the source vertices, subdividing the source polygonal data model having the modified source vertices to generate the designed part, wherein subdividing the source polygonal data model causes vertices in the designed part to be petitioned such that the designed part conforms with the reference geometry at least partly because of the modified position of the modified source vertices, and displaying a representation of the designed part on the display.

9. The computer system of claim 8, wherein the designed part comprises vertices approximately on the reference geometry.

10. The computer system of claim 8, wherein generating the modification vectors comprises:

subdividing the source polygonal data model; and determining a first difference vector representing a difference of a position of a vertex of the subdivided data model and the reference geometry.

11. The computer system of claim 10, wherein generating the modification vectors comprises:

modifying the source polygonal data model based on the difference vector;

subdividing the modified source polygonal data model; and determining a second difference vector representing a difference of a position of a vertex of the subdivided modified source polygonal data model and the reference geometry.

12. The computer system of claim 8, wherein one or more of the modified source vertices is generated by subdivision.

13. The computer system of claim 8, wherein one or more of the modified source vertices is generated by subdivision of more than one level.

14. The computer system of claim 8, wherein one or more of the modified source vertices is not generated by subdivision.

15. A non-transitory computer readable medium comprising non-transient instructions, which, when executed cause the computer to generate a designed part having a portion conforming to a companion structure having a known topology according to a method comprising:

accessing, from a memory of the computer, a reference geometry representing the topology, accessing, from the memory, a source polygonal data model, wherein the source polygonal data model comprises a plurality of source vertices, generating modification vectors based on data generated by subdividing the source polygonal data model;

modifying position characteristics of one or more of the source vertices, wherein the position characteristics are modified based on the modification vectors, wherein the source vertices are modified so that after the source polygonal data model is subdivided, vertices in the subdivided polygonal data model corresponding with the modified source vertices conform to the reference geometry, after modifying the source vertices, subdividing the source polygonal data model having the modified source vertices to generate the designed part, wherein subdividing the source polygonal data model causes vertices in the designed part to be petitioned such that the designed part conforms with the reference geometry at least partly because of the modified position of the modified source vertices, and displaying a representation of the designed part on a display.

* * * * *